United States Patent [19]

Waffler et al.

[11] Patent Number: 5,477,461
[45] Date of Patent: Dec. 19, 1995

[54] METHOD FOR AVOIDING COLLISIONS BETWEEN A MOTOR VEHICLE AND OBSTACLES

[75] Inventors: Andreas Waffler, Neubiberg; Walter Weishaupt, Munich; Winfried Siegl, Beilngries, all of Germany

[73] Assignee: Bayerische Motoren Werke Aktiengesellschaft, Germany

[21] Appl. No.: 249,346

[22] Filed: May 27, 1994

[30] Foreign Application Priority Data

May 28, 1993 [DE] Germany ............... 43 17 960.6

[51] Int. Cl.⁶ .................... G06F 13/376; B60T 7/16
[52] U.S. Cl. ............... 364/461; 180/169; 340/903; 364/460
[58] Field of Search ............... 364/461, 424.02, 364/447; 340/903; 367/96; 180/169; 250/214 B; 356/5

[56] References Cited

U.S. PATENT DOCUMENTS

| | | |
|---|---|---|
| 3,897,150 | 7/1975 | Bridges et al. ............... 356/5 |
| 4,670,845 | 6/1987 | Etoh ............... 364/461 |
| 4,716,298 | 12/1987 | Etoh ............... 250/561 |
| 4,802,096 | 1/1989 | Hainsworth et al. ............... 364/461 |
| 5,040,116 | 8/1991 | Evans Jr. et al. ............... 364/424.02 |
| 5,128,874 | 7/1992 | Bhanu et al. ............... 364/461 |
| 5,170,352 | 12/1992 | McTamaney et al. ............... 364/424.02 |
| 5,189,619 | 2/1993 | Adachi et al. ............... 364/426.04 |
| 5,314,037 | 5/1994 | Shaw et al. ............... 180/169 |
| 5,331,561 | 7/1994 | Barrett et al. ............... 364/447 |
| 5,339,075 | 8/1994 | Abst et al. ............... 340/903 |
| 5,341,344 | 8/1994 | O'Brien et al. ............... 367/96 |
| 5,347,120 | 9/1994 | Decker et al. ............... 250/214 B |

FOREIGN PATENT DOCUMENTS

| | | |
|---|---|---|
| 0475169A2 | 8/1991 | European Pat. Off. . |
| 0544468A2 | 11/1992 | European Pat. Off. . |
| 3415572 | 8/1984 | Germany . |
| 4028789 | 3/1992 | Germany . |
| 4028788 | 3/1992 | Germany . |
| 4222409 | 1/1993 | Germany . |

Primary Examiner—Kevin J. Teska
Assistant Examiner—Russell W. Frejd
Attorney, Agent, or Firm—Evenson, McKeown, Edwards & Lenahan

[57] ABSTRACT

In a method for avoiding a collision of a motor vehicle with an obstacle, in which the output signal from a distance measuring device with a plurality of scanning beams emitted fanwise in and beside the motion path of the motor vehicle is fed to an evaluation unit, the output signal from a steering angle sensor is additionally fed to the evaluation unit. The motion path of the motor vehicle is calculated in the evaluation unit and the obstacle is evaluated in terms of the motion path of the motor vehicle. The obstacle is taken into account only if it enters the motion path of the motor vehicle.

2 Claims, 2 Drawing Sheets

TARGETS NOT TRACKED

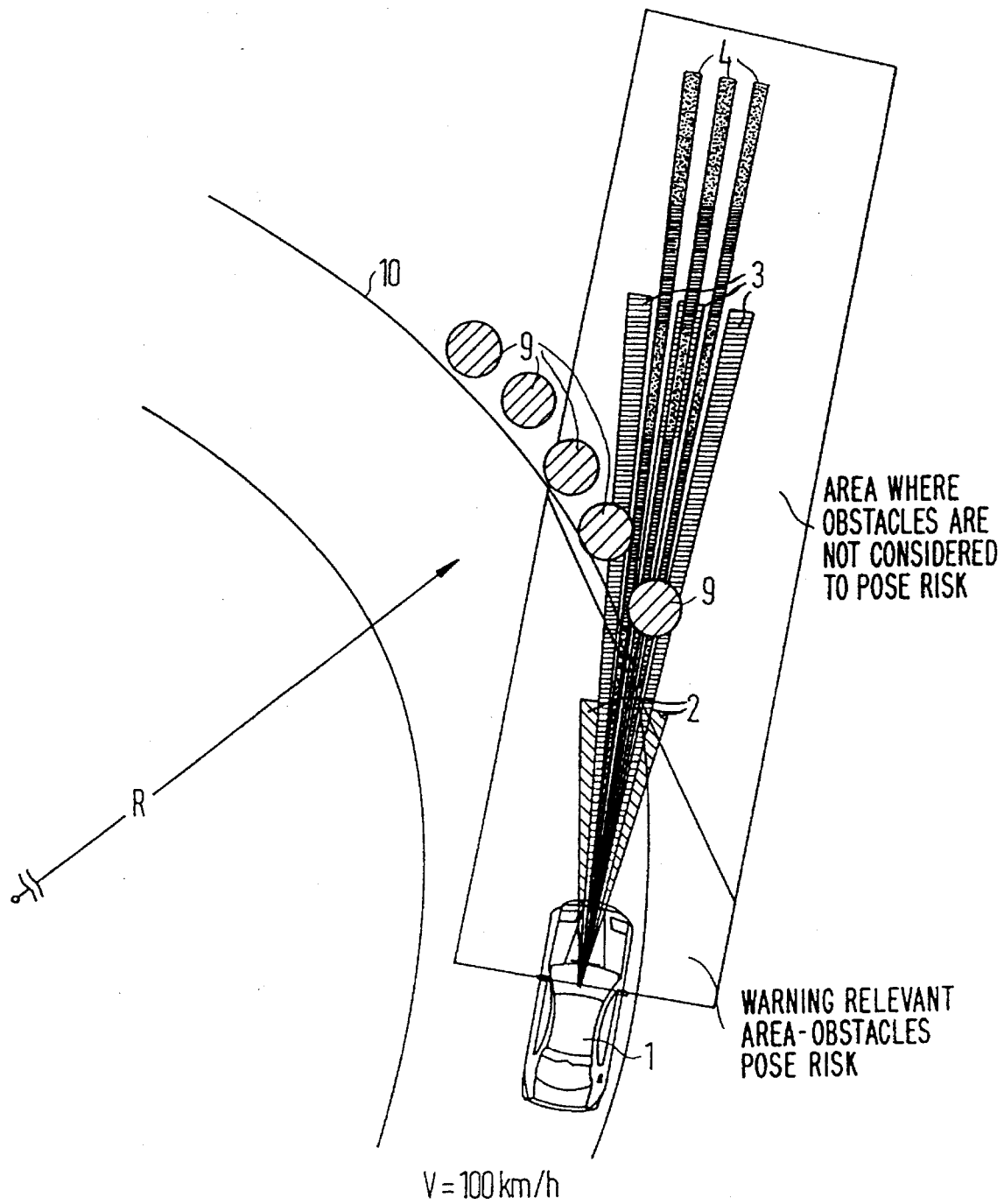

METHOD FOR AVOIDING COLLISIONS BETWEEN A MOTOR VEHICLE AND OBSTACLES

BACKGROUND AND SUMMARY OF THE INVENTION

The present invention relates to a method for avoiding collisions of motor vehicles and, more particularly, to a method for avoiding a collision of a motor vehicle with an obstacle. According to the method, an output signal is emitted from a distance measuring device with a plurality of scanning beams from an evaluation unit being emitted fanwise in and beside the motion path of the motor vehicle.

A distance measuring device is preferably a laser-based device as described, for example, in DE 40 28 788 A1 and DE 40 28 789 A1. It is important, in this connection, that the investigation area includes not only the motion path alone, but the areas located to the sides thereof.

An object of the present invention is to provide a collision avoidance method in which an indication is reliably given of the threatening danger of a collision with an obstacle while also substantially avoiding incorrect solutions.

The foregoing objects have been achieved according to the present invention by providing a method in which an output signal of a steering angle sensor is supplied to an evaluation unit, a motion path of the motor vehicle in the evaluation unit is calculated, at least one obstacle is evaluated in relation to the motion path of the motor vehicle, and the at least one obstacle is taken into account only if that obstacle enters the motion path of the motor vehicle.

An essential aspect of the present invention is the evaluation of the obstacles with respect to the collision danger which they pose. For example, the motion path or the motion of a potential obstacle is related to the motion path of the motor vehicle and only when the danger of a collision actually exists is a suitable collision-avoiding measure initiated. This can be either an optical or acoustical indication to the vehicle operator or a controlling- or regulating-influence on driving behavior, e.g. by applying the brake or reducing the engine power.

One especially advantageous embodiment of the present invention is concerned with fixed obstacles. These obstacles are not taken into consideration when they are located outside the motion path of the motor vehicle. This embodiment of the invention is characterized by an advantageous relatively low cost of computational apparatus, since fixed obstacles can be calculated less expensively in terms of their relationship to the motion path of the motor vehicle.

BRIEF DESCRIPTION OF THE DRAWINGS

These and other objects, features and advantages of the present invention will become more apparent from the following detailed description thereof when taken in conjunction with the accompanying drawings wherein:

FIG. 2 is a schematic showing another embodiment of the present invention in which a vehicle cornering or rounding a curve recognizes obstacles which do not pose risk as opposed to obstacles that do pose risks.

DETAILED DESCRIPTION OF THE DRAWINGS

Figure 1:
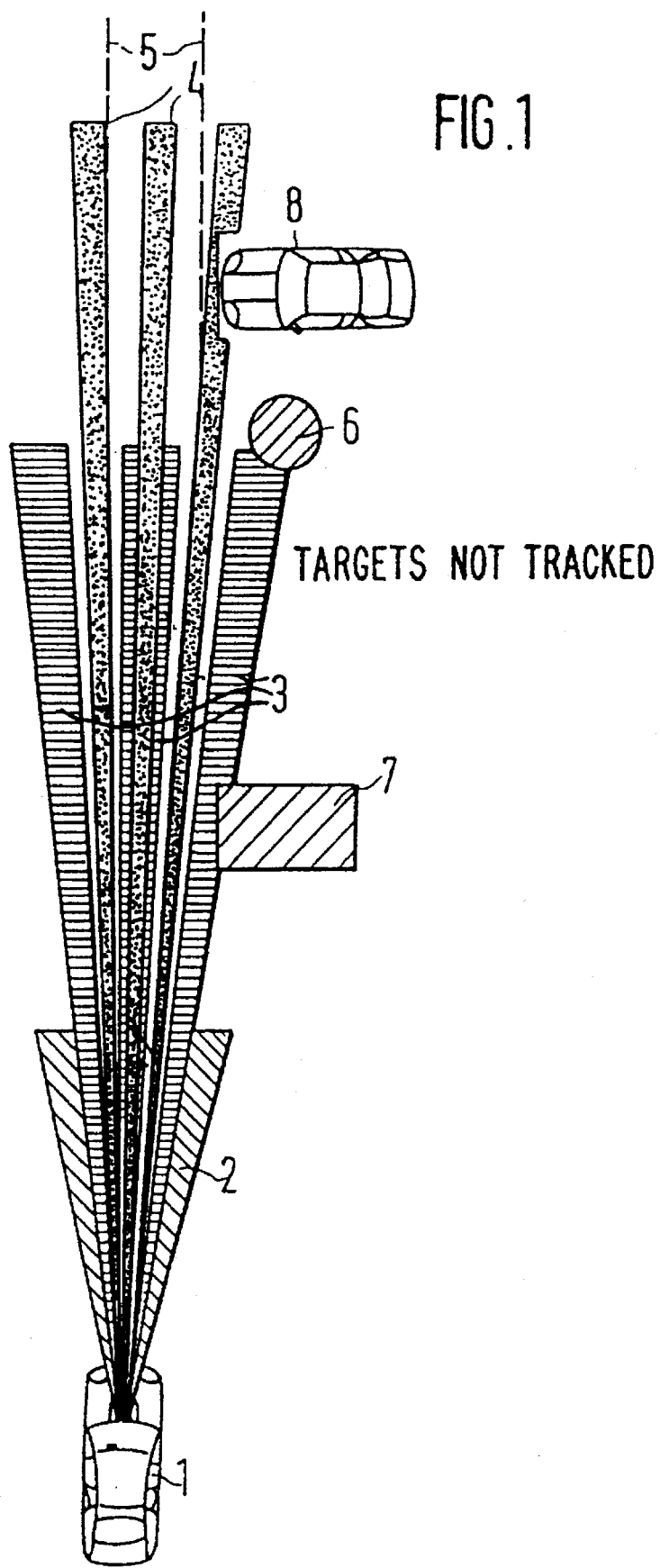
FIG. 1 is a schematic showing one embodiment of the present invention in which fixed obstacles are not tracked and a moving obstacle is regarded when a determination is made that it is moving in the direction of the motion path.

In the embodiment shown in FIG. 1, a motor vehicle 1 is shown schematically as viewed from above, emitting three triads (2, 3 and 4) of laser beams in the direction of travel. The triads are directed into different range areas and have an aperture angle that decreases with increasing distance of the investigated area. The light beams reflected from the investigated areas are evaluated in a conventional evaluation unit (not shown) on the motor vehicle, and a possibly fixed obstacle is evaluated in terms of its distance and position relative to the motion path of the motor vehicle. A movement of motor vehicle 1 in a straight line is assumed in FIG. 1. The evaluation unit then takes its departure from a motion path of the motor vehicle 1 that is limited by two lines 5 drawn using dashes.

Each of the beam triads 2, 3, 4 directs the central beam into the area of the motion path between the lines 5, while the two marginal or outside beams leave the motion path area. If objects are detected with the aid of the marginal or outside beams located outside the motion path of the motor vehicle 1, the obstacles are then evaluated in terms of their significance for the motor vehicle 1. It is also then determined what sort of obstacles they are, i.e. what kind of motion, if any, they are performing relative to the motion path. If it is detected that, as assumed here, obstacles 6 and 7 are fixed and located outside the motion path of motor vehicle 1, these obstacles are not graded as critical and no warning or indication of any kind is given.

In the case of another obstacle, shown as a vehicle 8, assumed to be moving transversely to the motion path of a cornering motor vehicle 1, it is determined what significance this obstacle has for the motor vehicle 1. If it is determined that the motor vehicle is both outside the motion path of the motor vehicle 1 and is also located even further from this motion path, the obstacle 8 is likewise disregarded. However, if it is determined that the obstacle 8 is moving in the direction of the motion path of the motor vehicle 1, upon approaching this motion path, a corresponding signal is given by the evaluation unit and gives the corresponding warning or signaling measure.

In the embodiment of FIG. 2, the motion path of a cornering motor vehicle 1 is determined in the evaluation unit. In contrast to the embodiment of FIG. 1, travel of the motor vehicle 1 around a curve with a radius R is assumed. This is accomplished with the aid of a suitable known steering angle sensor, which as a rule always active and is a physically present sensor, or an evaluation unit (not shown), via which the curve radius R is determined from the differences in rotational speeds of the vehicle front wheels.

In the embodiment shown in FIG. 2, fixed obstacles, e.g. roadside trees 9 are, located outside the motion path of motor vehicle 1 which has an outer limit or boundary 10. Here again, fixed obstacles outside the motion path of the motor vehicle 1, i.e. in the area of the rectangle identified as posing no risk are not taken into account whereas the fixed obstacles in the warning-relevant area are taken into account. In this way, superfluous false warnings or other warning measures are reduced to an avoidable minimum.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for avoiding a collision of a motor vehicle with an obstacle, comprising the steps of emitting an output signal from a distance measuring device with a plurality of scanning beams from an evaluation unit being simultaneously emitted fanwise in and outwardly of a motion path of the motor vehicle to detect at least one obstacle, supplying an output signal of a steering angle sensor to the evaluation unit, calculating a motion path of the motor vehicle, evaluating the at least one obstacle in relation to the motion path of the motor vehicle, and taking into account the at least one obstacle only if same enters the motion path of the motor vehicle so as to evaluate obstacles in relation to a collision danger posed thereby.

2. The method according to claim 1, wherein a fixed obstacle is not taken into account if same is located outside the motion path of the motor vehicle.

* * * * *